US008695016B2

(12) United States Patent
Scurlock, Jr.

(10) Patent No.: US 8,695,016 B2
(45) Date of Patent: Apr. 8, 2014

(54) METHOD AND SYSTEM FOR RECOVERING STRANDED OUTBOUND MESSAGES

(75) Inventor: James E. Scurlock, Jr., Helena, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/558,011

(22) Filed: Jul. 25, 2012

(65) Prior Publication Data

US 2012/0291046 A1 Nov. 15, 2012

Related U.S. Application Data

(63) Continuation of application No. 12/123,796, filed on May 20, 2008, now Pat. No. 8,255,925, which is a continuation of application No. 10/319,489, filed on Dec. 16, 2002, now Pat. No. 7,376,957.

(51) Int. Cl.
*G06F 9/54* (2006.01)

(52) U.S. Cl.
USPC ........... 719/314; 719/311; 719/313; 719/315; 709/213; 709/214; 709/215; 709/216; 709/217

(58) Field of Classification Search
None
See application file for complete search history.

(56) References Cited

U.S. PATENT DOCUMENTS

| 4,665,520 A | * | 5/1987 | Strom et al. ...................... 714/15 |
| 5,426,774 A | * | 6/1995 | Banerjee et al. ................. 714/16 |
| 5,465,328 A | | 11/1995 | Dievendorff et al. |
| 5,703,570 A | * | 12/1997 | Gorday et al. ............... 340/7.22 |
| 5,754,754 A | * | 5/1998 | Dudley et al. .................... 714/18 |
| 5,856,978 A | | 1/1999 | Anthias et al. |
| 5,878,056 A | | 3/1999 | Black et al. |
| 5,881,296 A | * | 3/1999 | Williams et al. ............... 710/263 |
| 5,924,097 A | * | 7/1999 | Hill et al. ........................ 707/703 |
| 6,014,673 A | | 1/2000 | Davis et al. |
| 6,088,796 A | | 7/2000 | Cianfrocca et al. |
| 6,138,158 A | | 10/2000 | Boyle et al. |
| 6,279,041 B1 | | 8/2001 | Baber et al. |
| 6,345,281 B1 | * | 2/2002 | Kardos et al. .................. 700/100 |
| 6,425,017 B1 | | 7/2002 | Dievendorff et al. |
| 6,434,605 B1 | | 8/2002 | Faulkner et al. |

(Continued)

OTHER PUBLICATIONS

Cobb, The impact of object technology on commercial transaction processing, The VLDB Journal—The International Journal on Very Large Data bases, vol. 6, Issue 3 (Aug. 1997) pp. 173-190, Springer-Verlag New York, Inc.

(Continued)

*Primary Examiner* — Andy Ho
*Assistant Examiner* — Shih-Wei Kraft
(74) *Attorney, Agent, or Firm* — Wolff & Samson, PC

(57) ABSTRACT

A method for recovering and requeueing lost messages is disclosed. The lost messages are intended for delivery from a first computer program to a second computer program but are instead stranded in locations internal to the first program. The method extracts one or more of these stranded messages from the location internal to the first program, determines the original destination of each stranded message and delivers that message to the second program. Delivery of each message to the second program is facilitated by using message queues provided by middleware type software programs. The desired middleware program can be selected by the user of the method, and the method provides for the necessary formatting of each recovered message according to the selected middleware. Absent use of the present method, these stranded messages would not be routed to their original destinations.

6 Claims, 1 Drawing Sheet

(56) References Cited

U.S. PATENT DOCUMENTS

| | | |
|---|---|---|
| 6,446,206 B1 | 9/2002 | Feldbaum |
| 6,636,855 B2 | 10/2003 | Holloway et al. |
| 6,654,805 B1 | 11/2003 | Aldred et al. |
| 6,760,911 B1 | 7/2004 | Ye |
| 6,769,079 B1 | 7/2004 | Currey et al. |
| 6,817,018 B1 | 11/2004 | Clarke et al. |
| 6,859,834 B1 | 2/2005 | Arora et al. |
| 6,965,765 B2 | 11/2005 | Creemer et al. |
| 6,970,945 B1 | 11/2005 | Berkman et al. |
| 7,039,671 B2 | 5/2006 | Cullen |
| 7,127,507 B1 | 10/2006 | Clark et al. |
| 7,249,163 B2 | 7/2007 | Hickson et al. |
| 7,590,138 B2 | 9/2009 | Benard et al. |
| 2001/0039579 A1* | 11/2001 | Trcka et al. .................. 709/224 |
| 2002/0087704 A1 | 7/2002 | Chesnais et al. |
| 2002/0120717 A1 | 8/2002 | Giotta |
| 2003/0105800 A1 | 6/2003 | Cullen |
| 2003/0195811 A1 | 10/2003 | Hayes et al. |
| 2004/0153511 A1 | 8/2004 | Maynard et al. |
| 2006/0209868 A1 | 9/2006 | Callaghan |

OTHER PUBLICATIONS

Jung, et al., Design of MOBILE MOM: Message oriented middleware service for mobile computing, Parallel Processing, 1999, Proceedings, 1999 International Workshops, Sep. 21-24, 1999, pp. 434-439.

* cited by examiner

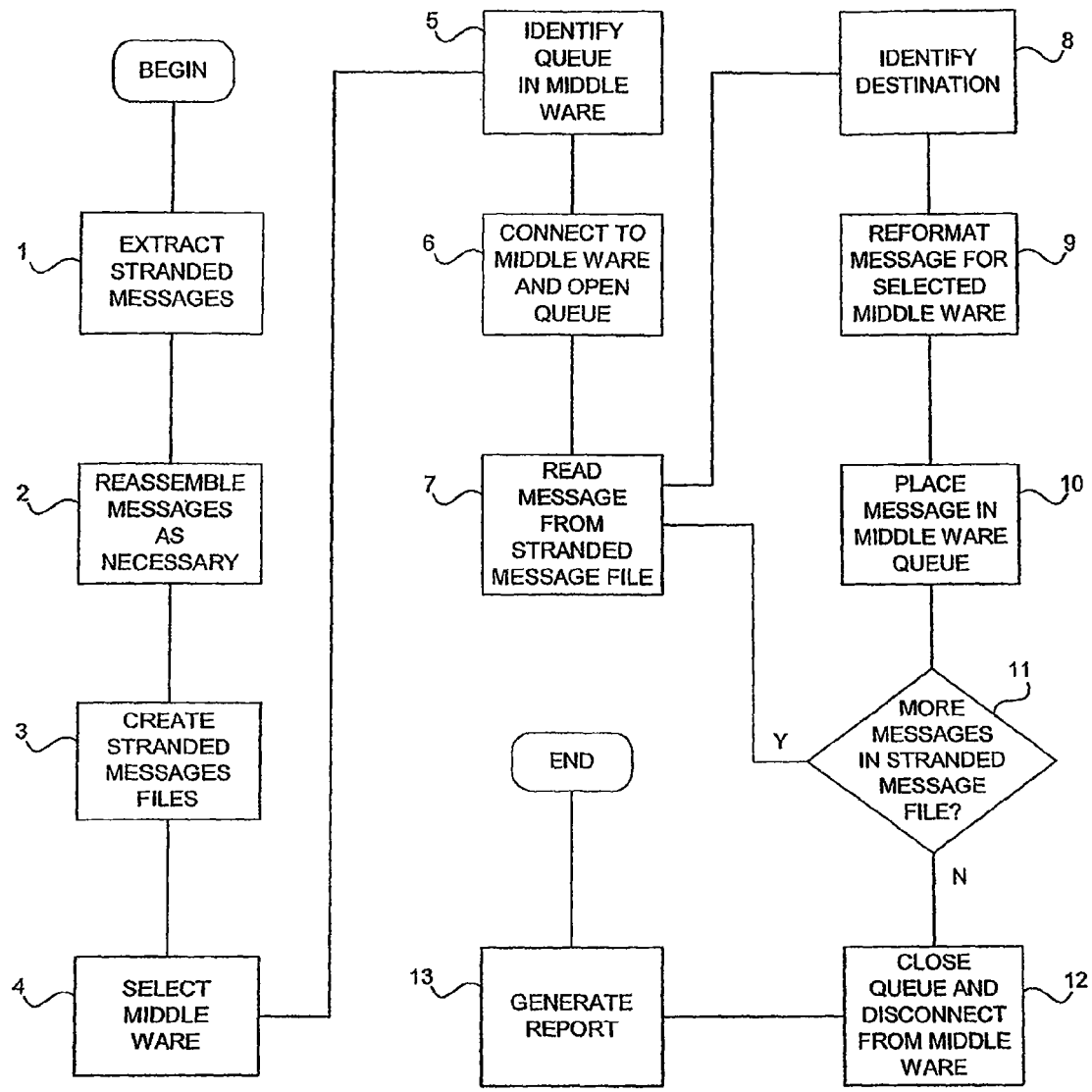

METHOD AND SYSTEM FOR RECOVERING STRANDED OUTBOUND MESSAGES

CROSS REFERENCE TO RELATED APPLICATIONS

This application is a continuation of U.S. patent application Ser. No. 12/123,796, filed May 20, 2008, now U.S. Pat. No. 8,255,925, which is a continuation of U.S. patent application Ser. No. 10/319,489, filed Dec. 16, 2002 and issued as U.S. Pat. No. 7,376,957 on May 20, 2008, both of which are incorporated by reference herein in their entirety.

COMPUTER PROGRAM

A computer program listing appendix has been submitted on two compact discs (an original and a duplicate) and is incorporated by reference herein. Each of the compact discs contains the computer program listing appendix in a file entitled "13807.0556.txt".

FIELD OF THE INVENTION

The present invention relates to queuing systems for messages delivered between two software applications.

BACKGROUND

Independent software programs that could also be running on different platforms have a need to exchange messages such as data. In order to send such messages, a source program sends a message to a destination external to the source program. An exit routine within the source program recognizes that the message is bound for a destination outside of the source program. The externally bound message is routed to message queue in a middleware program. This middleware program acts as a bridge between the source program and a separate independent destination program.

Errors can occur during the routing of these outbound messages from the source program through the middleware program, and instead of being routed through the middleware, the outbound messages are misdirected or stranded in default message queues internal to the source program. For example, these messages are sent to a destination that, although originally valid for outward bound messages, becomes invalid or is no longer recognized as directed to the middleware for routing outside the source application. Once stranded in an internal default message queue, these messages are effectively "lost" and are never recovered or delivered to the destination program. The source program does not contain a utility or routine to recover these misdirected messages. In fact, the source program may not even recognize that the messages are lost and may not be able to determine the location of the lost messages.

A method is needed to identify messages bound for delivery outside of a source program but misdirected and not delivered. What is needed are suitable methods that would identify the misdirected messages, extract the messages from the location to which the messages were improperly delivered and re-route or re-queue these messages through the middleware.

SUMMARY OF THE INVENTION

Embodiments of the present invention include a method, computer executable code and programmed computer system for recovering a plurality of messages stranded in a destination internal to a first computer executable program and intended for delivery to a second computer executable program through a middleware computer executable program. An embodiment of the present invention recovers a plurality of component messages stranded in a destination or location internal to the first program and routes these recovered messages to a message queue in a middleware software program for delivery to the second computer program to which these stranded messages should have been delivered originally. The recovery method includes extracting a plurality of component messages from the destination internal to the first program, reassembling the logs records as necessary to create the plurality of stranded messages and saving the messages to a stranded message file on an appropriate computer readable storage medium.

The operator utilizing a method of the present invention can select the middleware to be used and can identify the message queue within the selected middle for routing of the recovered messages. These selections are provided to the method of the present invention as inputs, for example as input parameters from a user to the computer executable code. In one embodiment, all of the messages or entries in the stranded message file are read. During reading, the original destination of the message is determined, and the message is reformatted for delivery to the middleware message queue and ultimate delivery to the original destination. After the messages have been read and routed through the middleware, the method of the present invention closes the queue and disconnects from the middleware program. If desired, reports detailing the results of the recovery process can be generated and outputted.

The method of the present invention provides the advantages and benefits of recovering and redelivering stranded messages that would otherwise be unrecoverable. Therefore, these messages, which can include large data files, do not have to be recreated.

BRIEF DESCRIPTION OF THE DRAWINGS

FIG. 1 is a flow chart illustrating an embodiment of a method for recovering lost messages according to the present invention.

DETAILED DESCRIPTION

A method according to the present invention recovers at least one and preferably a plurality of messages stranded in a destination internal to a first computer executable program and intended for original delivery to a second computer executable program. Delivery of the stranded messages is through a middleware type computer executable program. The first and second computer executable programs are any computer program containing computer executable code stored on a computer readable storage medium and executable by a logical processor. These computer programs can operate on any one of a number of computer platforms including DOS, Windows, UNIX, VAX, and mainframe platforms. In one embodiment, the platform is an IBM mainframe. The first and second computer executable programs can be the same program, can be different programs, can be on the same platform and can be on different platforms. Suitable first and second computer programs include Information Management System (IMS) programs, commercial available from IBM Corporation of Armonk, N.Y.

The middleware program is selected to serve as a bridge between the first computer executable program and the second computer executable program for routing messages between the two programs. The middleware program contains at least one message queue for receiving messages, such as data or other types of files, that are destined from the first program to the second program. Suitable middleware programs can connect to and interface with the programs and platforms of the first and second computer programs. In one embodiment, the middleware computer program is MQSeries® or Websphere MQ® commercially available from IBM Corporation of Armonk, N.Y.

An embodiment of the present invention includes a computer executable code for executing the steps of the method. The computer executable code utilizes algorithms readily available and known to one of skill in the art and can be written in any suitable language, for example assembler language, based upon compatibility with the platforms and languages of the first computer program, the second computer program and the middleware program.

Another embodiment of the present invention includes a computer system or programmed computer for executing a method and computer executable code according to the present invention. Any conventional computer system available and known to one of skill in the art can be used in this embodiment and should be compatible for reading and executing the computer executable code embodying a method according to the present invention. The programmed computer includes a computer readable memory having at least one region to store the computer executable program code that embodies the method of the present invention and a processor for executing the program code stored in that memory. Suitable memory includes Random Access Memory, Compact Disc Read Only Memory, a hard-disk type drive, a tape drive, a floppy disk type drive, and combinations thereof.

In order to recover lost or stranded messages using a computer executable code recovery program embodying a method according to the present invention as illustrated in FIG. 1, the recovery program extracts at least one stranded message from a memory destination or address that represents a location internal to the first program 1. Preferably, the recovery program extracts a plurality of stranded messages. The recovered messages, however, are not always in the form of complete messages but may have been broken down into a plurality of components or packets. For example, because the original message was not or could not be delivered, that message is recorded into a log and can be broken into the components or packets before it is entered into the log. In order to facilitate routing and reassembly, the components or packets include the information necessary for the routing and reassembly of each component, for example in a header associated with that component.

The recovery program obtains this destination and reassembly information, for example, through the record log of the messages stored in the location internal to the first program. Therefore, in another embodiment, the recovery program extracts a plurality of component messages or record logs from the destination internal to the first program. Each component message contains at least a portion of a message intended for delivery from the first program to the second program, routing information and information necessary for the reassembly of component message at the message destination. The recovery program reassembles the component messages as necessary to recreate the original messages 2 by making the necessary associations among the numerous component messages to create complete messages.

In order to facilitate processing of the recovered plurality of stranded message, the recovery program creates a stranded message file 3 on a memory medium and in a memory location accessible by the recovery program. In one embodiment, this memory location and medium within the programmed computer containing the recovery program. The recovery program saves the extracted stranded messages to the stranded message file. In one embodiment, the recovery program extracts the messages and message components, reassembles of the message components, creates the stranded message file and saves the messages to the stranded message using existing tools, such as software program tools, created for use with the first computer program. Suitable existing tools include Queue Control Facility, commercially available from IBM Corporation of Armonk, N.Y. The recovery program can use existing software tools to carry out these steps by containing computer executable code that acts as a call to the software tools.

The user or party attempting to recover stranded messages from the first program selects a middleware program to be used for delivery of the recovered messages 4 and further identifies at least one message queue within the selected middleware for receipt and routing of the recovered messages 5. The message queue represents a memory location in a computer readable memory medium that is accessible and readable by the middleware and provides a temporary location for receipt of messages to be forwarded to the second program. In one embodiment, this memory location and medium are disposed within the programmed computer containing the recovery program. The user can select the middleware program and can identify the message queue as, for example, inputs to the computer executable code embodying the present method. Inputting the user's selections is facilitated by data entry prompts and graphical interfaces provided by the recovery program. Suitable data entry prompts and graphical interfaces are known and available in the art. Alternatively, a separate recovery program is developed for interfacing with each one of a plurality of middleware programs. In this embodiment, the user selects a middleware program by choosing and running the recover program developed for the desired middleware program.

Based upon the selected middleware and the identified message queue, the recovery program connects to the middleware and opens the queue 6 by accessing the appropriate location on the computer readable storage medium in which the stranded message file was saved. The recovery program reads a recovered message from the stranded message file 7. In one embodiment, the entire contents of each recovered message or message component is read. In another embodiment, only a header associated with each recovered message or message component containing the original destination information is read. The recovery program confirms that each recovered message was intended for a location external to the first program and identifies that destination 8.

Once the recovery program identifies the destination of a message, the message queue receives that message and holds the message until the middleware program routes the message to the second computer program. In order to facilitate reception of the message in the queue and routing of the message by the middleware program, the recovery program reformats each message to a format compatible with the selected middleware 9 and delivers the appropriately formatted message to the identified message queue 10. The middleware program, independent of the recovery program, then delivers the extracted message to the original destination. In order to provide for the delivery of all of the recovered messages, the recovery program includes an algorithm to determine if any additional recovered and unread messages remain in the stranded message file 11. If such additional messages exist, the recovery method repeats the steps necessary to recover, reformat and deliver each remaining message to the message queue. Any algorithm used for iteratively reading and extracting the entire contents of a list or computer file is suitable for use with the present method to read all of the messages within the stranded message file. Examples of suitable algorithms include if/then-type logic loops.

If no more messages exist in the stranded message file, the recovery program closes the message queue and disconnects from the middleware 12. The recovery program according to a method of the present invention, also provides for the generation of reports 13. Suitable reports contain information about the method including whether or not the recover process was successful, the number of messages recovered, and the delivery locations of the recovered messages. The recovery program generates these reports by delivery data necessary to create these reports to hardware output devices such as computer monitors and computer monitors. Alternatively, the recovery program saves the necessary report data to a computer readable storage medium.

An exemplary application of the method of the present invention is illustrated by the computer executable code submitted on the computer program listing appendix.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

What is claimed is:

1. A method for recovering a stranded message comprising:
    extracting a plurality of components from a default message queue of a first computer executable program using a recovery program;
    obtaining destination and reassembly information from the plurality of components;
    assembling the plurality of components, from the default message queue of the first computer executable program, into a recreated message using the recovery program, the assembling based on the destination and reassembly information from the plurality of components;
    creating a stranded message file;
    placing the recreated message in the stranded message file;
    connecting to a middleware computer executable program having a message queue;
    opening the message queue;
    reading the recreated message in the stranded message file;
    confirming that the recreated message is destined for a second computer executable program external to the first computer executable program;
    determining a desired destination for the recreated message;
    formatting the recreated message for the middleware computer executable program;
    placing the recreated message in the message queue; and
    delivering the recreated message in the message queue to the second computer executable program using the middleware computer executable program.

2. The method of claim 1 further comprising:
    reporting results of a stranded message recovery.

3. A computer readable storage device storing computer program instructions for recovering a stranded message, the computer program instructions, when executed on a processor, cause the processor to perform operations comprising:
    extracting a plurality of components from a default message queue of a first computer executable program using a recovery program;
    obtaining destination and reassembly information from the plurality of components;
    assembling the plurality of components, from the default message queue of the first computer executable program, into a recreated message using the recovery program, the assembling based on the destination and reassembly information from the plurality of components;
    placing the recreated message in a stranded message file;
    connecting to a middleware computer executable program having a message queue;
    opening the message queue;
    reading the recreated message in the stranded message file;
    confirming that the recreated message is destined for a second computer executable program external to the first computer executable program;
    determining a desired destination for the recreated message;
    formatting the recreated message for the middleware computer executable program;
    placing the recreated message in the message queue; and
    delivering the recreated message in the message queue to the second computer executable program using the middleware computer executable program.

4. The computer readable storage device of claim 3, the operations further comprising:
    reporting results of a stranded message recovery.

5. A device for recovering a stranded message, the device comprising:
    a memory storing computer program instructions;
    a processor communicatively coupled to the memory, the processor configured to execute the computer program instructions, which, when executed on the processor, cause the processor to perform operations comprising:
        extracting a plurality of components from a default message queue of a first computer executable program using a recovery program;
        obtaining destination and reassembly information from the plurality of components;
        assembling the plurality of components from the default message queue of the first computer executable program into a recreated message using the recovery program, the assembling based on the destination and reassembly information from the plurality of components;
        creating a stranded message file;
        placing the recreated message in the stranded message file;
        connecting to a middleware computer executable program having a message queue;
        opening the message queue;
        reading the recreated message in the stranded message file;
        confirming that the recreated message is destined for a second computer executable program external to the first computer executable program;
        determining a desired destination for the recreated message;
        formatting the recreated message for the middleware computer executable program;
        placing the recreated message in the message queue; and delivering the recreated message in the message queue to the second computer executable program using the middleware computer executable program.

6. The device of claim 5, the operations further comprising: reporting results of a stranded message recovery.

* * * * *